United States Patent [19]
Hoerenz et al.

[11] 3,827,070
[45] July 30, 1974

[54] DIGITAL DATA IMAGING SYSTEM

[75] Inventors: Peter G. Hoerenz, Hartsdale; Helmut Ludi, Eastchester, both of N.Y.

[73] Assignee: Carl Zeiss-Stiftung d.b.a. Carl Zeiss, Oberkochen/Wuerttemberg, Germany

[22] Filed: Aug. 1, 1973

[21] Appl. No.: 384,760

[52] U.S. Cl. ............................................. 354/105
[51] Int. Cl. ........................................... G03b 17/24
[58] Field of Search ............................... 95/1.1, 18

[56] References Cited
UNITED STATES PATENTS

| | | | |
|---|---|---|---|
| 518,372 | 4/1894 | Mackenstein | 95/1.1 |
| 2,051,193 | 8/1936 | Wittel | 95/1.1 |
| 2,403,733 | 7/1946 | Mainardi | 95/18 |
| 2,987,976 | 6/1961 | Martin | 95/1.1 |
| 3,354,342 | 11/1967 | Ohntrup | 313/108 |

Primary Examiner—John M. Horan
Attorney, Agent, or Firm—Sandoe, Hopgood & Calimafde

[57] ABSTRACT

The invention contemplates a camera-back construction, particularly for a roll-film camera, whereby digital data applicable to each exposed frame is automatically entered via the back side of the film along opposite longitudinal end margins of each frame. Separate multiple-digit banks of light-emitting diodes jointly utilize a single optical system for projecting their respective displays at the end margins of each frame.

14 Claims, 4 Drawing Figures

PATENTED JUL 30 1974　　　3,827,070
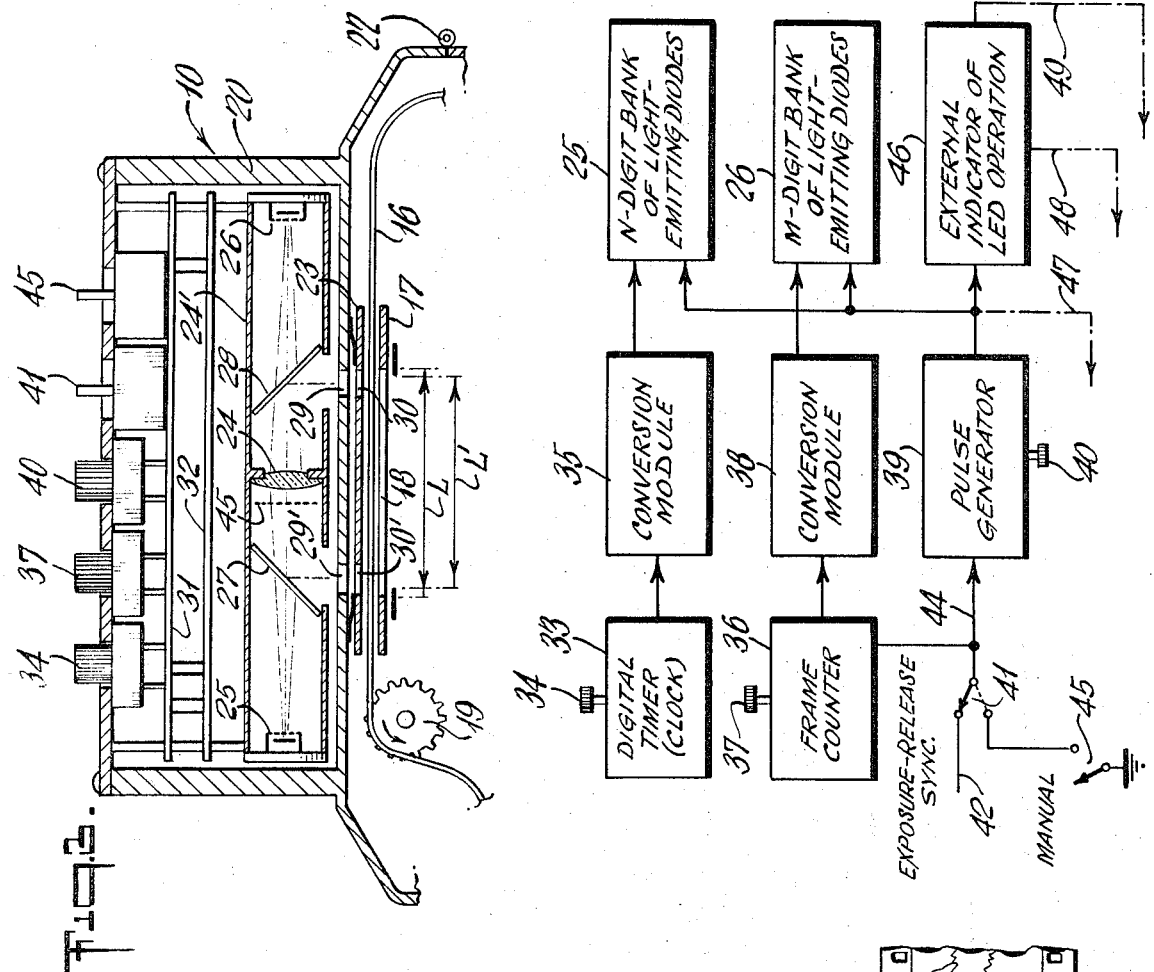
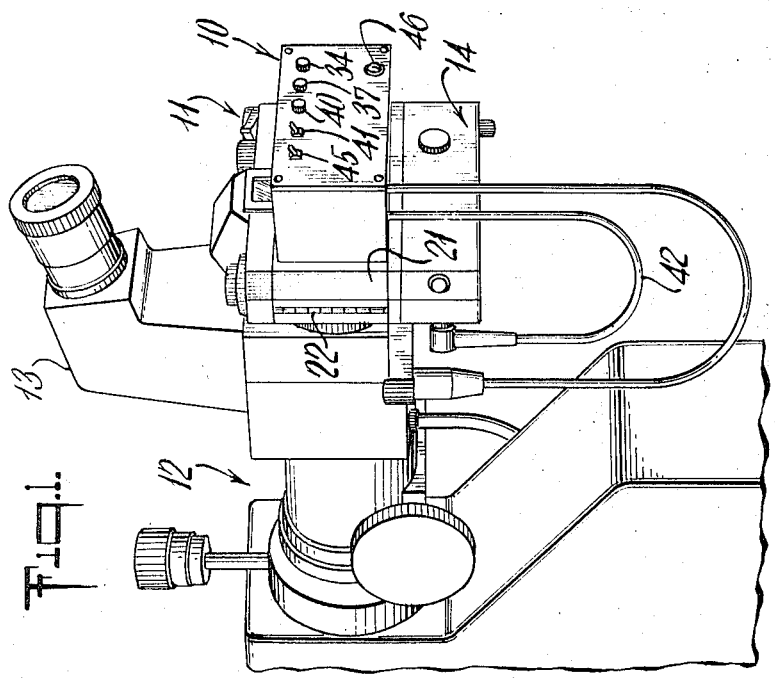
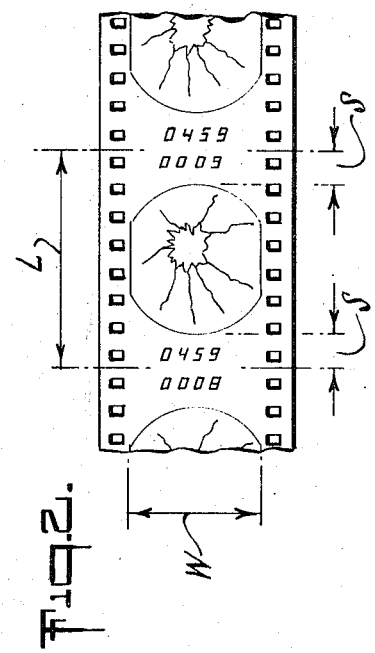

2
3,827,070
1

DIGITAL DATA IMAGING SYSTEM

The invention relates to means for imaging digital data at a margin of each frame of camera film, without interfering with the subject-matter image of each frame produced by camera-exposure action.

The prior art includes various proposed solutions to the problem of applying identifying data, such as camera-exposure data, time or date information, and the like to camera film, as a means of providing more ready classification and identification of large quantities of exposed frames, under different conditions. Most of these proposals require a light source to illuminate localized areas of one or more characterized masks, and one or more optical systems project an image of the mask areas onto the film. In all cases, elaborate mechanism is required to position the mask to enable the correct area thereof to be thus projected for each data exposure. So mechanically complex are such prior devices that they present severe limitations on the nature, quality and quantity of data that can be recorded; also, the time required to effect change of data to be recorded is necessarily subject to the limitations of mechanical inertia, hysteresis, and the like.

It is, accordingly, an object of the invention to provide improved means of the character indicated.

Another object is to meet the above object with structure requiring essentially no modification of camera parts.

A specific object is to provide means of the character indicated using no moving parts other than those involved in set-up selection.

Another specific object is to provide such means with a single optical projection system placing data images at opposite longitudinal end margins of each camera-exposed film frame.

A further specific object is to meet the above objects with a self-contained structure which may be attached as a replacement back to a standard camera.

It is a general object with such improved structure to achieve greatly expanded opportunity to record frame-identifying data, with ready selection of options to be recorded, with extreme speed of response to changed data imput, and with great reliability, all within relatively compact structural volume.

Other objects and various further features of novelty and invention will be pointed out or will occur to those skilled in the art from a reading of the following specification, in conjunction with the accompanying drawings. In said drawings, which show, for illustrative purposes only, a preferred form of the invention:

FIG. 1 is a view in perspective of our invention applied as an attachment to a standard roll-film camera body which, in turn, is mounted to photograph observations through an optical instrument;

FIG. 2 is a view of a fragment of roll film exposed through use of the apparatus of FIG. 1;

FIG. 3 is a simplified sectional view through the attachment of FIG. 1, the view being taken at a central horizontal plane therethrough; and FIG. 4 is a simplified diagram schematically depicting electrical components.

Referring to the drawings, the invention is shown in application as an attachment 10 to the back of a standard roll-film camera body 11, which in turn is mounted to photograph observations through scientific apparatus 12. The apparatus 12 may be of various kinds, as for the handling of metallurgical, medical or other specimens to be observed through photo micrographs, and in a particularly important application, the apparatus 12 is designed for ophthalmological observations, as will later be more clear. As shown, the apparatus includes a reflex viewer 13; and a unit 14 for automatic film-advance, shutter-winding, and multiple-exposure control is shown to provide automated operation of the camera body 11.

In ophthalmological applications, the instrument 12 and camera body 11 create exposures on 35-mm film, in the nature depicted in FIG. 2, for one frame and for parts of the two immediately adjacent frames. The exposed subject matter may thus, for example, be an enlarged view of a portion of a cornea, within a circular field 15 which may be slightly truncated by the width margins W of the exposure-frame window of the camera body 11. The field 15 is centered between longitudinal margins L of the exposure-frame window, leaving available space S for data entry at each longitudinal end of each frame. First and second multiple-digit decimal data entries appear at these respective end spaces, the digit-array alignment in each case extending transversely of the film. Preferably, the recorded digits are large enough to permit viewing without need for special equipment, but it will be appreciated that if special viewing equipment is permissible, then vastly increased quantities of data (at reduced scale) may be accommodated in spaces S.

As far as body 11 is concerned, FIG. 3 shows only those parts which coact with the attachment 10. Thus, film 16 is conveyed from a supply cartridge (not shown) at the right, over a film support 17 having an exposure-frame window 18, and a film-advance sprocket 19 engages the marginal perforations of the film. The digit-imaging system of attachment 10 is seen to be contained within a compact housing 20 secured to the back cover 21 of body 11; cover 21 may be standard in all respects except for its adaptation to the invention, so that attachment 10 may be hinged at 22 and locked to body 11 in the usual manner. As is customary, a pressure plate 23 is resiliently carried inside cover 21 and keeps the film flat and in the focal plane for subject matter exposure.

Within housing 20 an optical system, shown as a single double-convex element 24, is fixedly mounted with respect to the base structure afforded by cover 21. Element 24 is longitudinally centrally positioned, in terms of the exposure-frame dimension L, and its axis is oriented parallel to the dimension L, at an elevation which may coincide with the midpoint of the dimension W. Separate digital-display devices 25–26 face element 24 at equal and opposite longitudinal offsets therefrom; each such display device may comprise an array of light-emitting diodes, being logic-operated from quantized input data to create a linear-array display of multiple decimal digits, as for example, four-digit arrays, with or without decimal point, as suggested by entries on the film fragment depicted in FIG. 2. Fixed semi-transparent 45-degree reflectors 27–28 are interposed between element 24 and the displays 25–26, at symmetrical opposite offsets, to coincide with aligned slot openings 29–30 (29'–30') in cover 21 and plate 23 in the longitudinal end margins S of the exposure-frame window. Thus, the multiple-digit display at 25 is imaged by element 24, via means 28–29–30 (at the back side of the film 16) at one region S, while the multiple-digit display at 26 is imaged by the same element 24, via means 27–29′–30′ at the other region S of the same exposure frame.

Preferably, the display devices 25–26, mirrors 27–28, and lens element 24 and 211 mounted in a single subassembly, the frame 24′ of which may be tubular, constructed for example as semi-cylindrical halves and secured to housing 20 at 21, by means not shown.

The remaining contents of housing 20 comprise one or more circuit boards 31–32 for mounting the various components of the solid-state control and logic system serving the multiple-digit display devices 25–26. Such components are schematically depicted in FIG. 4, wherein the display device 25 is labeled as providing N digits of display, while device 26 is indicating a capacity for M digits, such designations being understood as generic for whatever number may be desired for particular recording purposes. For example, a digital timer or clock 33, having provision for zero or other setting at 34, may through a suitable conversion module 35 determine the instantaneous digit-displayable condition of device 25; in like manner, an exposure-frame counter 36, having provision for zero or other setting at 37, may through a suitable conversion module 38 determine the instantaneous digit-displayable condition of device 26. Both devices 25–26 are activated, for light emmission, by pulse-generator means 39, having provision for duration adjustment at 40 to assure that the digital-data exposure to film 16 is appropriate to the speed rating of the film. A switch 41 enables selection as between manual and automatic operation, the latter involving (for each exposure) use of a synchronizing signal in line 42 from the camera body 11, to provide an indexing pulse in line 43 to frame counter 36 and to provide a trigger pulse in line 44 to the pulse generator 39. In its "manual" selected position, switch 41 affords push-button control at 45 of the initiation of the pulse used for digital display, as will be understood.

It will be seen that the described invention meets all stated objects and that it lends itself to a variety of applications to suit needs for recording of particular data. Should the camera body be fitted with a more conventional lens system, the attachment of the invention involves little additional encumbrance to the portable use of the camera. If color film is used, it will be understood that filter means 45 of color selected for maximum contrast with that of the expected subject matter may be fixedly positioned to the display-imaging alignment, in which case the full image area L × W will be utilized for desired subject matter, subject to entry of the superposed marginal digits. On the other hand, to assure maximum contrast at all times, the film support window may be slightly reduced, as by local application of opaque masking tape 46 to the longitudinal ends at registry with slots 29–30 and 29′–30′; this result is schematically suggested in FIG. 3 by detached heavy lines to margin limits at the reduced spacing L′.

While the invention has been described in detail for a preferred form, it will be understood that modifications may be made without departing from the scope of the invention. For example, a lamp 46 on the back panel of housing 20 may be connected to the output of pulse generator 39, to provide an external indication of the fact of operation of the light-emitting diodes, for a given camera exposure; and an interlock connection from the same output connection to the film-advance mechanism may provide interlocked assurance against exposing more than one digit to a given area of film at the focal plane. Such interlocked control of digit exposure is suggested by phantom line 47 in FIG. 4.

Alternatively, the means designated 46 will be understood to include its own bistable flip-flop whereby pulse output at 39 is operative to change the state of the flip-flop and thus for example illuminate and hold the brilliance of the lamp at 46; this condition would be held as a warning against double-digit exposure until an electrical signal from the film-advance mechanism certifies that the film has been advanced since the previous digit exposure, and the phantom connection 48 in FIG. 4 will be understood to schematically designate the means for generating such a control signal as well as its connection to reset the flip-flop at 46, thus extinguishing the external indicator lamp at 46. Still further alternatively, a positive interlock from means 46 to exposure-release mechanism of the camera body is suggested schematically at 49 in FIG. 4, the same being operative to forestall a second exposure by such release mechanism or by the described digit-exposure mechanism, unless and until the film has been advanced by means 19 and certified by a signal in line 48.

What is claimed is:

1. As an article of manufacture, a camera-back assembly adapted to fit over the backside of film positioned for exposure at a rectangularly framed focal plane in the camera, said assembly comprising a structural frame including a base having two digit-exposure openings at locations longitudinally spaced in accordance with longitudinally opposed marginal offsets from the optical center of the camera-exposure frame, two light-emitting digital-display devices carried by said structural frame at longitudinally spaced locations behind said base, said devices being spaced to equal extents longitudinally beyond said openings, a first mirror for one of said devices and positioned to direct light therefrom through the digit-exposure opening that is more remote from said one device, a second mirror for the other of said devices and positioned to direct light therefrom through the other digit-exposure opening, and transparent focusing means positioned between said mirrors and in such manner as to simultaneously (a) image the display of said one device via said first mirror and through said more remote opening to a focal plane on the camera-mountable side of said base and (b) image the display of said other device via said second mirror and through the other opening to said focal plane, the image locations in said focal plane being longitudinally offset in accordance with the spacing of said openings, said focusing means being selected and positioned to project digit images at said focal plane within such a limited total longitudinal fraction of the longitudinal dimension of said exposure frame that a clear camera-exposure area exists at the exposure frame, said clear area having a longitudinal extent which is at least substantially the width dimension of the exposure frame.

2. The article of claim 1, in which a film-pressure plate is resiliently carried by the camera-mountable side of said base, said plate spanning both base openings and having openings in register with said base openings.

3. The article of claim 1, in which said mirrors are semi-transparent and light from one of the displays passes through the mirror serving the other display, while light from the other display passes through the mirror serving the one display.

4. The article of claim 3, in which said structural frame includes an elongate tube by which said displays, mirrors and focusing means are structurally united as a subassembly.

5. The article of claim 1, in which each of said displays comprises an array of light-emitting diodes.

6. The article of claim 5, in which said camera-back assembly further includes electrical pulse-generating means having excitation connection to said displays.

7. The article of claim 5, in which said camera-back assembly further includes electrical digit-sequence program means having control connection to said display devices.

8. The article of claim 5, in which said program means includes a timer whereby at least one of said display devices indicates time, and display-excitation means having synchronizing connection adapted for connection to the exposure mechanism of the camera to which said back-assembly is mounted.

9. The article of claim 5, in which said program means includes a timer whereby at least one of said display devices indicates exposure frame, and display-excitation means having synchronizing connection adapted for connection to the exposure mechanism of the camera to which said back-assembly is mounted.

10. An exposure-marking roll-film camera device, comprising a camera body with means for supporting and longitudinally advancing roll film with respect to an exposure-frame region in a focal plane, said body further including back structure covering the backside of said exposure-frame region, said exposure-frame region including a camera-exposure window frame having a rectangular opening wherein the long dimension of the opening is in the longitudinal direction of film support, said back-structure comprising a housing and optical means establishing first and second optical-projection alignments, generally normal to said plane and at longitudinally spaced locations, two light-emitting digital-display devices carried by said back structure at longitudinally spaced locations behind said exposure-frame region, said devices being spaced to equal equal extents longitudinally beyond said optical-projection alignments; said optical means comprising a first mirror for one of said devices and positioned to direct light therefrom along the optical-projection alignment that is more remote from said one device, a second mirror for the other of said devices and positioned to direct light therefrom along the other optical-projection alignment, and transparent focusing means common to light projected on both said alignments and positioned between said mirrors and in such manner as to simultaneously (a) image the display of said one device via said first mirror and along said more remote projection alignment to said focal plane and (b) image the display of said other device via said second mirror and along the other projection alignment to said focal plane, said focusing means being selected and positioned to project digit images at said focal plane within such a limited total longitudinal fraction of said long dimension that at least a clear camera-exposure area at said window opening may extend longitudinally to substantially the extent of the width dimension thereof.

11. The camera device of claim 10, in which said exposure-frame region includes a camera-exposure window frame having a rectangular opening wherein the long dimension of the opening is in the longitudinal direction of film support, said focusing means being selected and positioned to project digit images at said focal plane within such a limited total longitudinal fraction of said long dimension that at least a clear camera-exposure area at said window opening may extend longitudinally to substantially the extent of the width dimension thereof.

12. The camera device according to claim 10, in which said body includes a display-device light-emission control having a coordinating connection to said first-defined means, said control connection being operative once per frame of film advance, whereby only one light-emitting diode projection will be made for a given area of film.

13. As an article of manufacture, a camera-back assembly adapted to fit over the backside of film positioned for exposure in the camera, said assembly comprising a structural frame including a base having two digit-exposure openings at locations longitudinally spaced in accordance with opposed marginal offsets from the optical center of the camera-exposure frame, two electrically operated light-emitting digital-display devices carried by said structural frame at longitudinally spaced locations behind said base, said devices being spaced to equal extents longitudinally beyond said openings, a first mirror for one of said devices and positioned to direct light therefrom through the digit-exposure opening that is more remote from said one device, a second mirror for the other of said devices and positioned to direct light therefrom through the other digit-exposure opening, and transparent focusing means positioned between said openings and in such manner as to simultaneously (a) image the display of said one device via said first mirror and through said more remote opening to a focal plane on the camera-mountable side of said base and (b) image the display of said other device via said second mirror and through the other opening to said focal plane, the image locations in said focal plane being longitudinally offset in accordance with the spacing of said openings; said camera-back assembly further including electrical pulse-generating means having excitation connection to said displays, said pulse-generating means including selectively variable pulse-width adjustment means, whereby light emitted for a given digit display may be adjusted as appropriate for the speed rating of film in the camera to which said camera-back assembly is applied.

14. The article of claim 13, in which each of said displays comprises an array of light-emitting diodes.

* * * * *

UNITED STATES PATENT OFFICE
CERTIFICATE OF CORRECTION

Patent No. __3,827,070__  Dated __July 30, 1974__

Inventor(s) __Peter G. Hoerenz and Helmut Ludl__

It is certified that error appears in the above-identified patent and that said Letters Patent are hereby corrected as shown below:

Correct the second inventor's name
from "Helmut Ludi" to -- Helmut Ludl --.

Signed and sealed this 11th day of February 1975.

(SEAL)
Attest:

RUTH C. MASON
Attesting Officer

C. MARSHALL DANN
Commissioner of Patents
and Trademarks